United States Patent [19]

Bauer

[11] Patent Number: 5,190,654
[45] Date of Patent: Mar. 2, 1993

[54] PROCESS FOR PRODUCING AN ULTRA-THIN AND ASYMMETRIC MINERAL MEMBRANE

[75] Inventor: Jean-Michel Bauer, Pagny S/Moselle, France

[73] Assignee: Le Carbone Lorraine, Courbevoie, France

[21] Appl. No.: 731,340

[22] Filed: Jul. 17, 1991

[30] Foreign Application Priority Data

Jul. 24, 1990 [FR] France ............................ 90 09999

[51] Int. Cl.⁵ .............................................. B01D 71/04
[52] U.S. Cl. ................................ 210/490; 210/500.25; 210/500.26; 427/246
[58] Field of Search ....................... 210/500.25, 500.26, 210/496, 505, 490, 503; 427/244, 245, 246; 55/16, 158

[56] References Cited

U.S. PATENT DOCUMENTS 4,175,153 11/1979 Dobo et al. .................. 55/16 X

FOREIGN PATENT DOCUMENTS 604826 9/1978 France.

Primary Examiner—Frank Spear
Attorney, Agent, or Firm—Dennison, Meserole, Pollack & Scheiner

[57] ABSTRACT

Disclosed is a process for producing a mineral membrane on a mineral support, involving the production of a dispersion of a filler and a resin, depositing this dispersion onto a support so as to form a layer, followed by the thermal treatment of the support covered with the layer, to obtain an asymmetric thin membrane. A fluid dispersion is prepared of a filler, a water-soluble solvent and a resin insoluble in water but soluble in the organic solvent, and, after coking, to a coke content higher than 20% by weight, it is deposited onto the mineral support, all or some of the solvent is displaced in order to precipitate the resin, and the resin and, if appropriate, the support are coked.

11 Claims, 2 Drawing Sheets

PROCESS FOR PRODUCING AN ULTRA-THIN AND ASYMMETRIC MINERAL MEMBRANE

FIELD OF THE INVENTION

The subject of the invention is the production of porous and permeable mineral membranes which can be used on porous and permeable mineral supports. These membranes are intended to be employed in separating techniques and more particularly in microfiltration and ultrafiltration. By mineral membranes are meant essentially ceramic membranes or membranes containing carbon.

STATE OF THE ART

In contrast to organic membranes or those with an organic matrix, mineral membranes make it possible to carry out the filtration of hot and corrosive fluids. This is their essential usefulness.

There are known processes for producing ceramic or carbon-containing membranes:

Ceramic membranes can be obtained by depositing on a porous support a layer of slip laden with fine grains of mineral material, this deposition being followed by drying and baking at a sufficiently high temperature to sinter the grains of mineral material. Such a process is described in European Application No. 092,840.

Carbon-containing membranes can be obtained, according to European Patent No. 250,346, by depositing by coating on a porous support an emulsion comprising carbon-containing particles and a thermosetting resin giving a high coke content during coking, deposition being followed by a polycondensation treatment of the resin and then by coking.

SET PROBLEM AND SUBJECT OF THE INVENTION

The essential defect of the membranes of the prior art is the thickness of the membrane which limits its permeability These large thicknesses are a result of the need to have a membrane of sufficient mechanical characteristics or alternatively of limitations in the deposition techniques which make it impossible to obtain a layer of small and constant thickness.

Solutions have been provided for improving the permeability of the membranes, particularly by producing asymmetric membranes by the deposition on a porous support of successive layers comprising mineral particles of decreasing granulometry, as indicated, for example, in European Patent No. 250,346.

Under the best possible conditions, the active layer of the membrane has thicknesses greater than 2 $\mu$m, the active layer of an asymmetric membrane being that of smaller porous diameter.

The primary object of the invention is a process making it possible to produce an asymmetric mineral membrane having an active layer of a thickness reduced considerably in relation to the prior art and therefore of very high permeability.

DESCRIPTION OF THE INVENTION

The process for producing a mineral membrane according to the invention involves the preparation of a fluid dispersion comprising a filling of finely divided inorganic materials and a coking resin, the deposition of this dispersion onto a mechanically stable mineral support, if appropriate non-porous, so as to form a layer, and the thermal treatment of the said support covered with the said layer, for the purpose of coking the resin, and is characterised in that, in order to obtain in a single deposition an asymmetric membrane having an active layer of small thickness, there is prepared a fluid dispersion comprising a finely divided inorganic material, a water-soluble organic solvent and a resin insoluble in water but soluble in the organic solvent, and, after coking, giving a coke content higher than 20% by weight, a layer of the said dispersion is deposited onto the said mineral support the said layer is put in contact with water in such a way as to displace all or some of the said organic solvent from the layer by means of water and to precipitate the resin thermal treatment is carried out for the purpose of coking the resin and, if appropriate, the support.

The invention will be understood better from a look at FIG. 1 which shows diagrammatically the result obtained: the membrane (2) deposited on a porous mineral support (1) does not have a uniform porous diameter along the filtration axis perpendicular to the membrane. It comprises an outer part (3) with very fine pores and of small thickness and an inner part (4) of greater thickness and with coarser pores.

Thus, the invention makes it possible to solve the set problem in an especially simple way by adopting the deposition techniques of the prior art, but utilising particular physico-chemical phenomena.

Of the water-soluble solvents of the invention, it will be preferable to choose solvents completely miscible in water, and of these preferably dioxane and dimethylformamide (DMF). The choice of the solvent and that of the resin are linked, the resin having to be soluble in the solvent, but not in water, preferably completely soluble in the solvent.

Tests showed that thermosetting resins, such as phenolic or furanic resins, were unsuitable because they are soluble in water. In contrast, thermoplastic resins, such as polyacrylonitrile, soluble in DMF, and polyvinylidene chloride, soluble when hot in dioxane, are preferred according to the invention, but other thermoplastic resins can also be used, for example a styreneacrylonitrile copolymer resin or methyl methacrylate resin which are soluble in acetone. All the resins soluble in a water-soluble solvent do not lead to exactly the same result, doubtless because of the physicochemical differences between the resins, for example the more or less polar nature which can influence the way in which the resin will precipitate in contact with water, to form a structure which will approximate more or less to that of the membrane (2) of FIG. 1.

The inorganic materials used as a filler and constituting the dispersion according to the invention are not specific to the invention. These are fine powders of ceramic materials (zirconia, alumina, silicon carbide etc.) or carbon-containing materials (powders of coke, of carbon black or of graphite, finely crushed carbon fibres, etc.) of a mean particle size of between 0.1 and 10 $\mu$m.

The preparation of the dispersion of inorganic materials in the resin solution in the water-soluble solvent is carried out in a way known per se, if appropriate employing additives making it possible to control the properties of the dispersion, for example its viscosity and its stability in time.

It is possible to use solvent mixtures or resin mixtures, provided that the solubility conditions are adhered to, and mixtures of inorganic materials.

The proportions of the various constituents of the dispersion are not critical, but for obvious reasons of economy, the highest possible content of resin and of inorganic material compatible with sufficient fluidity is selected. However, the weight ratio between the inorganic material and the resin must be between 0.5 and 15, preferably between 2 and 10, so that the membrane has sufficient mechanical stability.

The dispersion obtained according to the invention is deposited by any known means onto a porous support which can be made of ceramic, polygranular carbon or sintered metals, but preferably of carbon-carbon composite which is the subject of European Patent No. 208,629. The latter support has the advantage itself of being thin (1 mm) and of high mechanical characteristics. Moreover, its adjustable porosity is especially suitable for the invention.

It is also possible to deposit a layer of the dispersion onto a non-porous support which is a precursor of a porous support: in fact, the porous support described in European Patent No. 208,629 is obtained by impregnating a fibrous substrate with a resin of the phenolic type, followed by a shaping, a polymerisation and a carbonisation, the porosity appearing only during this last step. It is therefore expedient from an economic point of view to deposit a dispersion layer according to the invention onto a support with a carbon-containing substrate and with a polymerised matrix and subsequently to carry out a thermal treatment involving a joint carbonisation of the membrane and of its support.

After being deposited onto the porous support, the dispersion layer is put in contact with water, in order to precipitate the resin, to form the asymmetric structure shown diagrammatically in FIG. 1 (layer 2). It is important that the quantity of water is sufficient (washing with water) to ensure that the water/solvent mixture obtained as a result no longer dissolves the resin virtually at all.

In practice, at this stage, the deposited layer is impregnated with water containing no more than small quantities of organic solvent which are sufficiently small to ensure that, during the heating of the thermal treatment, there is no reconcentration of solvent which would possibly redissolve the resin.

The thermal treatment undergone by the porous support, provided with its layer of precipitated resin laden with inorganic material, involves a drying step to eliminate the water and the residual solvents, a possible oxidation step executed at around 200°–300° C. and a coking step in a neutral atmosphere at a temperature ranging from 700° to 1300° C.

It is surprising to find that after this thermal treatment, which ought to have "broken down" the layer (2) because of the thermoplastic nature of the resin, the asymmetric structure has been preserved and the membrane obtained comprises an active part (3), the thickness of which is very small, namely less than 0.1 $\mu$m, whereas the total thickness of the membrane is much greater, for example of the order of 2 $\mu$m.

Ultra-thin asymmetric mineral membranes of high permeability, especially useful in microfiltration and ultrafiltration, are thereby obtained.

Furthermore, the process according to the invention does not entail any significant extra cost in relation to the prior art and in some cases can even involve a lower outlay, particularly when a single thermal treatment common to the membrane and to its carbon-carbon composite support is carried out.

EXAMPLES

Example 1

Figure 1:
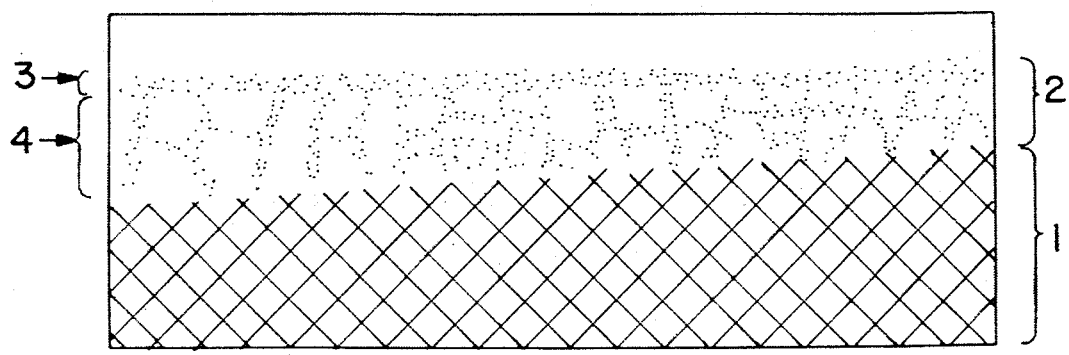
FIG. 1 shows diagrammatically, in cross-section, a membrane (2) on its support (1), with an active part (3) of small thickness and having pores of small diameter and with a part (4) of comparatively higher thickness and porosity.
Figure 2:
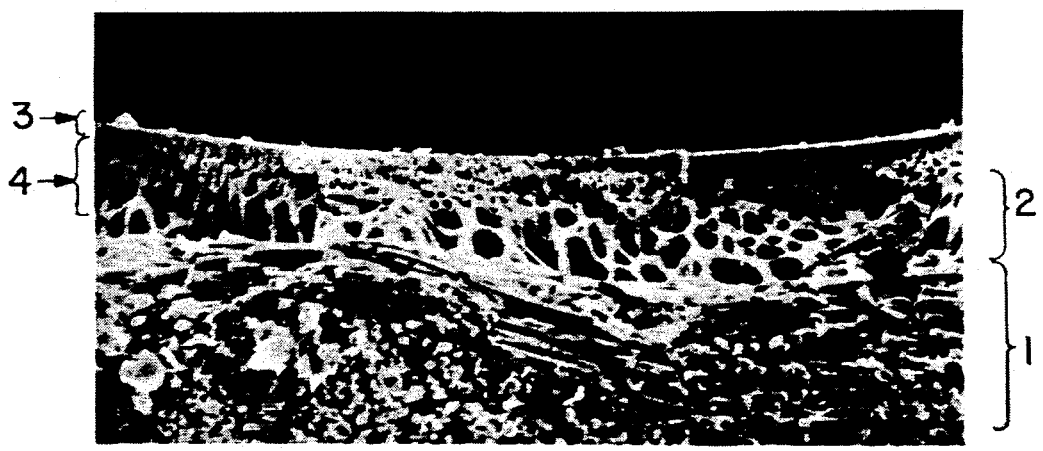
FIG. 2 is a photograph of a membrane on its support, obtained according to Example 1.
Figure 3:
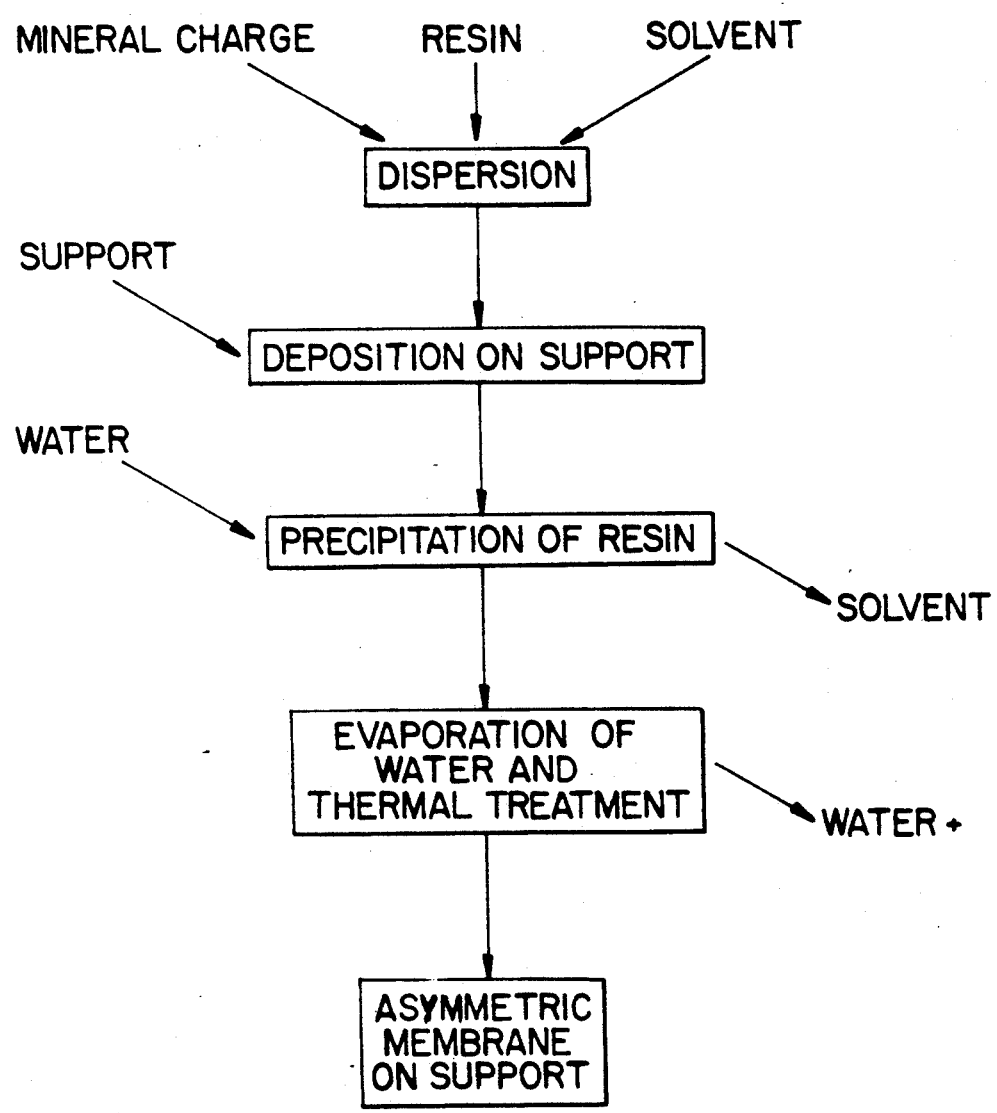
FIG. 3 shows diagrammatically, as a whole, the steps of the process according to the invention.

A fluid dispersion in dimethylformamide (DMF) of 0.5 $\mu$m carbon powder of mean particle size and of polyacrylonitrile in a carbon powder/polyacrylonitrile weight ratio of 9 is prepared.

This dispersion is deposited onto the inner surface of a porous tube made of composite material, the tube being filled and then emptied so as to form an adherent layer.

Water is first introduced progressively into the tube, and then, once the deposited layer has flocculated, washing is carried out with water.

The tube is dried in an oven and brought to 250° C., at which temperature the resin undergoes an oxidation brought about by the oxygen of the ambient air. The tube is thereafter put under a neutral atmosphere and is coked at 800° C.

A membrane of high permeability, the active part of which has a thickness of the order of 0.1 $\mu$m, is obtained.

Example 2

This example is similar to the preceding one, except that:
  the resin is polyvinylidene chloride
  the solvent is dioxane
  the mineral material is zirconia powder of a mean particle size of 0.1 $\mu$m
  the zirconia powder/polyvinylidene chloride weight ratio is 4
  the thermal treatment does not involve oxidation carried out at 250° C.

A membrane similar to that of Example 1 is obtained.

I claim:

1. A process for producing an asymmetric thin membrane on a support, aid asymmetric membrane comprising outer and inner layers disposed on the support, the outer layer being an active, porous layer of thickness less than about 0.1 $\mu$m, and the inner layer having a greater thickness and pore size than the outer layer, comprising the steps of:
   (a) preparing a fluid dispersion of a finely divided inorganic material, a water-soluble organic solvent, and a resin capable of being coked to a coke content greater than 20% by weight, and which resin is insoluble in water and soluble in the organic solvent;
   (b) depositing the fluid dispersion as a layer on a mineral support;
   (c) contacting the layer of fluid dispersion on the mineral support with water so as to displace at least some of the organic solvent from the layer and to precipitate the resin; and, (d) thermally treating the contacted layer-mineral support to convert at least the resin to coke and form an asymmetric, thin, coke-containing membrane.

2. Process according to claim 1, wherein the weight ratio between said inorganic material and said resin is between 0.5 and 15.

3. Process according to claim 2, wherein the weight ratio between said inorganic material and said resin is preferably between 2 and 10.

4. Process according to any one of claims 2 or 3, wherein said inorganic material is a powder selected from the group consisting of ceramic and carbon-containing material of a mean particle size of between 0.05 and 10 $\mu$m.

5. Process according to claim 4, wherein said inorganic material is a powder selected from the group consisting of zirconia, alumina, silicon carbide, coke, carbon black, graphite and finely crushed carbon fibres.

6. Process according to claim 1, wherein the mineral support is a porous support is selected from the group consisting of ceramic, polygranular carbon, sintered metal carbon-carbon composite.

7. Process according to claim 1 wherein the mineral support is non-porous and consists of a composite with a fibrous substrate selected from the group consisting of carbon fibre and a precursor of carbon fibre and a matrix of polymerised coking resin.

8. Process according to any one of claims 1, 2 or 3, wherein the resin is polyacrylonitrile and the organic solvent is dimethylformamide.

9. Process according to claim 8, wherein the thermal treatment step (d) is an oxidation step carried out between 200° and 300° C.

10. Process according to any one of claims 1, 2 or 3, wherein the resin is polyvinylidene chloride and the solvent is dioxane.

11. Asymmetric filtration membranes with an active layer of small thickness which are obtained by the process of claim 1.

* * * * *